Patented Nov. 12, 1935

2,021,063

UNITED STATES PATENT OFFICE 2,021,063

MANUFACTURE OF RESIN-RUBBER COMPOSITIONS

John Patrick Henharen, Durban, Union of South Africa

No Drawing. Application December 5, 1934, Serial No. 756,181. In Union of South Africa August 9, 1934

4 Claims. (Cl. 106—23)

This invention relates to the manufacture and production of a medium or base which is eminently suitable for use in the preparation of linoleum, oilcloth, floor and wall coverings, insulating compositions and like bodies, and has for its object to produce the said medium or base in a more economical manner than hitherto and to obtain products which are superior to the known media and bases for the said purposes.

According to this invention a medium or base for the purposes specified is obtained by heating common rosin, to a temperature of about 300° Fahrenheit, adding a drier and continuing the heating to about 540° Fahrenheit, adding rubber and stirring and heating until the rubber is dissolved.

During the said process, oxygen is given and is absorbed by the mixture. The resulting product is highly oxidized, is hard when cold and dries rapidly. It is of higher viscosity, of a higher degree of oxidation, dries more rapidly, is more durable and more weather-proof than the media or bases hitherto proposed for the purposes hereinbefore specified.

As suitable driers for use in the process may be mentioned cobalt linoleate, and other suitable linoleates and resinates.

The proportions of the initial material and of the rubber may be varied according to whether a product of heavy or light consistency is desired. For example if a heavy consistency is desired, the relative proportion of rubber to initial material is less than when a light consistency is required. The relative proportions of initial material to rubber may vary between about 4:1 and about 3:1. The amount of drier added depends on the drier used, the reaction conditions and the desired product; an amount of from about 2 to about 4 percent of the initial material may be mentioned by way of example.

When it is desired, for example for the purpose of preparing a base to be applied to a suitable substratum for the production of linoleum, to obtain a medium or base of somewhat lower viscosity, there may be mixed with the common rosin serving as the initial material suitable amounts of crude wood oil, boiled linseed oil or any other suitable oil or fatty acid thereof. The resulting product will then cover a larger area than a product obtained without the said admixture, but will be of somewhat inferior quality.

The following example will further illustrate how the said invention may be carried out in practice, but the invention is not restricted to this example. The parts are by weight.

Example 72 parts of common rosin are placed in a suitable pan and heated to 300° Fahrenheit. An amount of about 3 per cent of the initial material of cobalt linoleate is then added and heating continued until a temperature of 540° Fahrenheit is reached. 18 parts of rubber are then added gradually and the mixture is stirred and heating continued until the rubber has dissolved. During this latter stage of the process oxygen given off is absorbed by the mixture which, as the result of being highly oxidized, is hard when cold and dries rapidly. The resulting product is of higher viscosity, more fully oxidized, more rapidly drying, more durable and more weatherproof than the media hitherto proposed for the manufacture of linoleum, oilcloth, floor and wall coverings, insulating compositions and like bodies.

What I claim is:—

1. A process for the manufacture of a medium suitable for use in the preparation of linoleum, oilcloth, floor and wall coverings, insulating compositions and like bodies which comprises heating common rosin to about 300° F., adding a drier and heating to 540° F., adding rubber and stirring and heating until the rubber has dissolved.

2. A process for the manufacture of a medium suitable for use in the preparation of linoleum, oilcloth, floor and wall coverings, insulating compositions and like bodies which comprises heating common rosin to 300° F., adding from 2 to 4% of linoleate, heating to 540° F., adding rubber and stirring and heating until the rubber has dissolved.

3. A process for the manufacture of a medium suitable for use in the preparation of linoelum, oilcloth, floor and wall coverings, insulating compositions and the like bodies which comprises heating common rosin to 300° F., adding from 2 to 4% of a resinate, heating to 540° F., adding rubber and stirring and heating until the rubber has dissolved.

4. A process for the manufacture of a medium suitable for use in the preparation of linoleum, oilcloth, floor and wall coverings, insulating compositions and like bodies which comprises heating 72 parts of common rosin to 300° F., adding 3% of cobalt linoleate, heating to 540° F., adding 18 parts of rubber and stirring and heating until the rubber has dissolved.

JOHN PATRICK HENHAREN.